United States Patent [19]

Dotti et al.

[11] Patent Number: 4,527,592
[45] Date of Patent: Jul. 9, 1985

[54] FLOW CONTROL VALVE FOR HYDRAULIC CIRCUITS

[75] Inventors: Giulio Dotti, Milan; Bruno Roggero, Cinaglio, both of Italy

[73] Assignee: Fiat Auto S.p.A., Turin, Italy

[21] Appl. No.: 397,015

[22] Filed: Jul. 12, 1982

[30] Foreign Application Priority Data

Jul. 17, 1981 [IT] Italy ................. 67989 A/81

[51] Int. Cl.³ .......................... F15B 13/043
[52] U.S. Cl. ................... 137/625.61; 137/625.64
[58] Field of Search .............. 137/625.61, 625.64

[56] References Cited

U.S. PATENT DOCUMENTS

| 2,625,136 | 1/1953 | Moog | 137/625.61 |
| 2,823,689 | 2/1958 | Healy | 137/625.64 X |
| 3,055,383 | 9/1962 | Paine | 137/628.61 X |
| 3,646,851 | 3/1972 | Mohri | 137/625.64 X |
| 3,696,839 | 10/1972 | Irie | 137/625.61 |
| 3,918,488 | 11/1975 | Minami | 137/625.64 X |
| 4,194,719 | 3/1980 | Ewald et al. | 137/625.64 X |
| 4,367,765 | 1/1983 | Moretti et al. | 137/881 |
| 4,376,453 | 3/1983 | Moretti et al. | 137/625.64 |

FOREIGN PATENT DOCUMENTS 1425892  2/1976  United Kingdom ......... 137/625.61

Primary Examiner—Gerald A. Michalsky
Attorney, Agent, or Firm—Frost & Jacobs

[57] ABSTRACT

The valve of the invention is provided with a movable slide valve operable to open a first flow passage between a supply duct, which connects a source of fluid under pressure with the valve, and a utilization duct, which connects the valve itself with the utilizer, and a second flow passage between this utilization duct and a discharge duct; the slide valve is in equilibrium between a resilient force generated by a spring which acts on it and the force, in the opposite direction, generated by the fluid pressure which is supplied to a control chamber and the discharge flow cross section of which is controlled by a valve member operated by an electromagnet.

4 Claims, 4 Drawing Figures

4,527,592

FLOW CONTROL VALVE FOR HYDRAULIC CIRCUITS

BACKGROUND OF THE INVENTION

The present invention relates to an electromagnetically controlled valve for hydraulic circuits, which is able to regulate both the rate of flow of fluid supplied from a source of fluid under pressure to a utiliser device and the rate of discharge from this latter to the exhaust.

SUMMARY OF THE INVENTION

The valve of the invention is characterised by the fact that it includes a supply chamber in communication, through a supply duct, with the said source, a utilisation chamber in communication, through a utilisation duct, with the said utiliser, a discharge chamber in communication, through a first discharge duct, with the said exhaust, the said chambers being located alongside one another and being formed in a body of the valve; a slide valve movable axially within the said chambers and substantially comprising a first and a second cylindrical end section having the same diameter and a cylindrical central section of smaller diameter than the end sections, there being formed between each of the said end sections and the said central section respective first and second valve elements operable to control the opening of a first flow passage between the said supply chamber and the said utilisation chamber and a second flow passage between the said utilisation chamber and the said discharge chamber respectively, the said first end section of the slide valve being acted on by the force of a spring operable normally to hold the said slide valve displaced into its end-of-path position towards the other end; a control chamber formed in the said body, into which chamber the end of the said second end section of the slide valve projects, which chamber is in communication, through a control duct comprising a hole of predetermined dimensions, both with the said source and, through a second discharge duct, with the exhaust, there being located an interrupter member along the said second discharge duct operated by electromagnetic means and operable to vary the size of the flow cross section along the said second discharge duct for the purpose of varying in a controllable manner the fluid pressure in the said control chamber to control the displacement of the said slide valve by overcoming the force exerted by the said spring.

BRIEF DESCRIPTION OF THE DRAWINGS

For a better understanding of the valve of the invention there will now be given, by way of example, a description of an embodiment with reference to the attached drawing, in which.

DETAILED DESCRIPTION OF THE INVENTION

Figure 1:
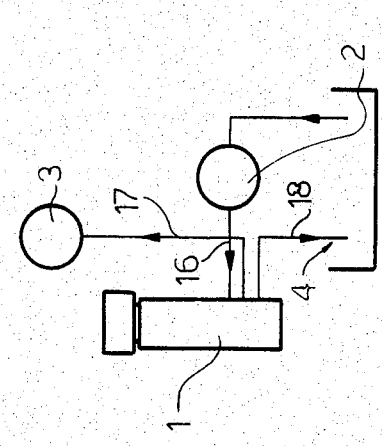
FIG. 1 is an hydraulic circuit diagram in which the valve of the invention is located.

The valve of the invention, indicated with the reference numeral 1 in FIG. 1, is adapted to be inserted in an hydraulic circuit of the type indicated in FIG. 1 to control the rate of flow of fluid supplied from a source of fluid under pressure, for example an hydraulic accumulator 2, to a utiliser device 3. The valve is also able to control the rate of flow of fluid discharged from this latter towards a discharge reservoir 4.

This valve is particularly suitable to be employed in apparatus for the control of an automatic gear box of the type described in application Ser. No. 397,017, now abandoned, filed by the Applicant on the same date as the present application.

Figure 2:
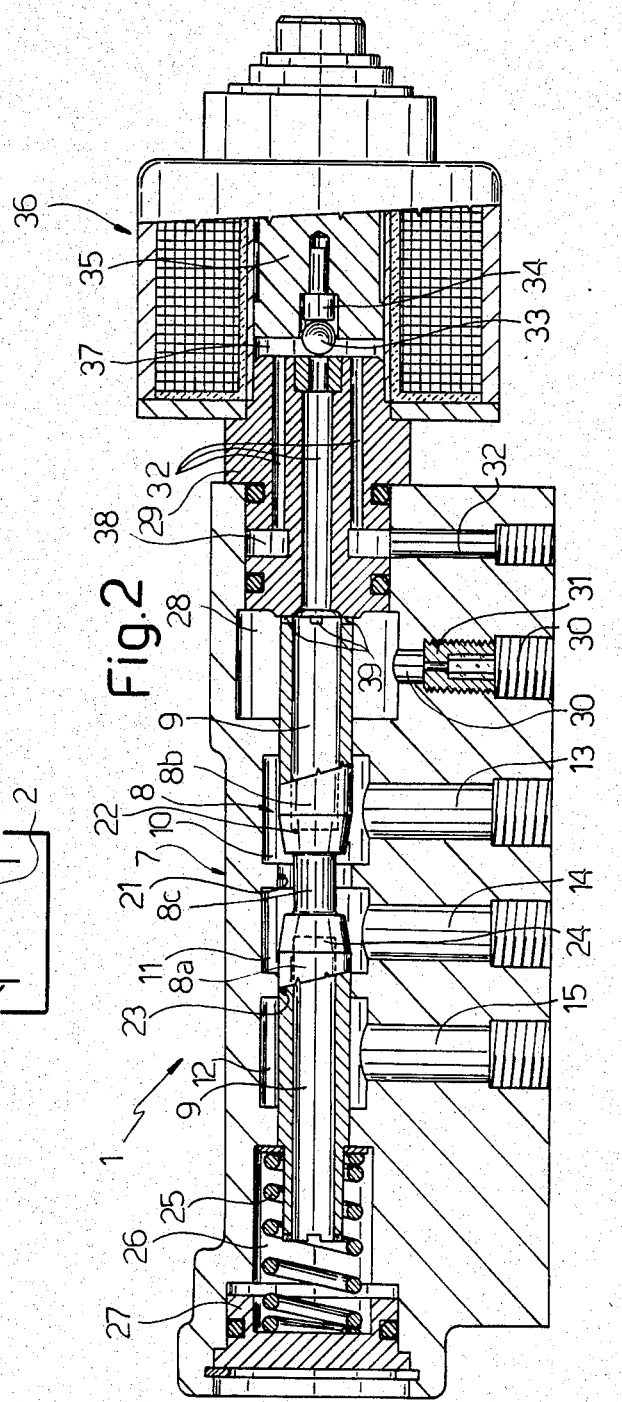
FIGS. 2 and 3 are schematic sections of the valve in two different operating positions.
Figure 3:
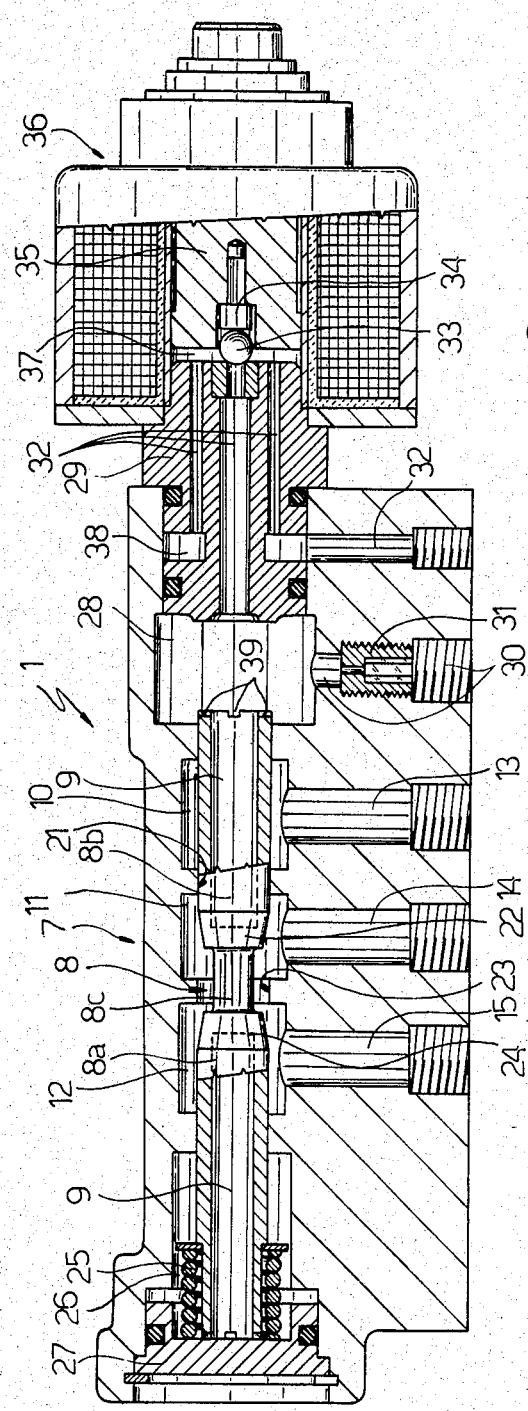

The valve schematically represented in FIGS. 2 and 3 includes a body 7 in one cavity of which there is movably mounted a slide valve 8 comprising two cylindrical end sections 8a, 8b having the same diameter, and a cylindrical central section 8c of smaller diameter than the end sections. In each of the said end sections there is formed a blind hole 9. The lateral surface of the slide valve defines with the surface of the said cavity substantially three chambers comprising a supply chamber 10, a utilisation chamber 11 and a discharge chamber 12, each of which is in communication with respective ducts, namely a supply duct 13, a utilisation duct 14 and a discharge duct 15. The first of these can be connected to the hydraulic accumulator 2 by means of a section of tubing 16 (FIG. 1) the second can be connected with the utiliser 3 by means of a section of tubing 17, and the third can be connected with the reservoir 4 by means of tubing 18.

The supply chamber 10 and the utilisation chamber 11 can be put in communication with one another through a port 21 the opening of which is controlled by a valve element 22 formed on the slide valve 8 between the end section 8b and the central section 8c (in the case of the embodiment of FIGS. 1 and 2 this is constituted by a conical surface. The utilisation chamber 11 and the discharge chamber 12 can be put in communication with one another through a port 23 (FIG. 3) the opening of which is controlled by a valve element 24 also formed on the slide valve 8 between the end section 8a and the central section 8c. On the left hand end of the slide valve 8 as viewed in FIGS. 2 and 3 there acts the force exerted by a helical spring 25 disposed in a cavity 26 formed at one end of the body 1, which spring is compressed between a washer which engages a shoulder of the slide valve itself and an end plug or cover 27.

The end section of the slide valve 8 which is to the right of FIGS. 2 and 3 projects into a cavity 28 which is closed by a bush 29 and which is in communication, via a duct 30, with the supply fluid. Within the duct 30 there is located a bush 31 having a hole of predetermined diameter which is small with respect to that of the duct. Further, the cavity 28 is in communication with the exhaust through a passage 32 along which is disposed a ball 33 or similar member which cooperates with a corresponding seat to regulate the flow cross section along the passage itself. This ball can be thrust against the said seat by a shaft 34 rigidly connected to a movable armature 35 of an electromagnet 36.

Passage 32 is constituted by an axial hole in the bush 29, a cavity 37 formed between the bush 29 and the armature 35 of the electromagnet 36, holes parallel to the axial hole in the bush and an annular groove 38 also formed in the bush 29.

When the slide valve 8 is in the position illustrated in FIG. 2 the flow of fluid between the cavity 28 and the duct 32 is allowed by notches 39 formed on the annular part of the end section 37 of the slide valve itself.

The operation of the valve described above is as follows.

Supposing the rate of flow of supply between the accumulator 2 and the utiliser 3 is to be regulated; when this has to be at the maximum allowed by the valve the electromagnet 36 is held in a configuration in which its shaft 34 is displaced to the right hand end-of-stroke position and therefore the passage through the passage 32, controlled by the ball 33, remains completely open. In these conditions the supply fluid which arrives at the valve also through the duct 30 (FIG. 2) enters by passing through the hole in the bush 31 into the cavity 28 and from this can flow freely towards the discharge duct 32. The pressure which is established in the said cavity is almot nil both because of the throttling of the fluid which takes place in traversing the hole in the bush 31 and by the free discharge along the duct 32. Consequently, since the resultant pressure applied by the fluid onto the slide valve 8 is substantially nil (because of the equality in the diameters of the end sections 36 and 37 of the slide valve itself) this is displaced into the configuration of FIG. 2 under the action of the helical spring 25. The port 21 between the supply chamber 10 and the utilisation chamber 11 is completely open to allow free passage of one fluid from the first to the other and from this towards the utiliser through the duct 14 of the valve itself.

When the rate of flow of supply fluid must be reduced, this is achieved by acting on the electromagnet 36 to displace the associated shaft 34 towards the left of FIG. 2 and therefore close the duct 32 with the ball 33 by a desired amount. It is apparent that by reducing the size of the flow passage through the duct 32 the pressure in the cavity 28 increases consequently making the resultant pressure on the slide valve 8 control the displacement towards the left of FIG. 2 of the slide valve itself overcoming the resilient reaction of the helical spring 25. For each degree of throttling of the said passage opening in the duct 32 there corresponds a well defined opening of the port 21 and therefore a well defined flow rate through the valve.

When the valve is to control the rate of flow of discharge, then by acting on the electromagnet 36 the passage through the discharge duct 32 is closed sufficiently to increase the pressure in the chamber 28 and carry the slide valve 8 to a configuration such as that of FIG. 3 in which, that is to say, the valve element 24 opens the passage 23 between the utilisation chamber 11 and the discharge chamber 12. In FIG. 3 the slide valve is shown at the end of its stroke such that the discharge passage is completely open. In this configuration, as can be clearly seen in FIG. 3, the slide valve closes the port 21 (FIG. 2) between the supply chamber 10 and the utilisation chamber 11.

The adjustment of the discharge port 23 can be achieved by acting on the electromagnet 36 in a similar way to that described in the case of the opening of the supply port 21. The fluid from the utiliser 3 (FIG. 1) arrives at the duct 14 (FIG. 3) of the valve, enters the utilisation chamber 11 and then flows to the discharge chamber 12 through the port 23 to flow to the exhaust through the discharge duct 15.

Figure 4:
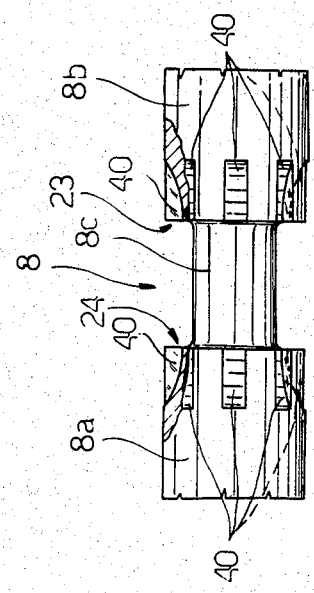
FIG. 4 is a variant of the valve member.

It will be apparent that the described embodiment of the present invention can be modified and varied both as to the form and to the arrangement of the various parts, without by this departing from the scope of the invention itself. In particular the valve elements 22, 23, 24 can have a different form and be constituted by cylindrical surfaces rather than conical surfaces, such as has been illustrated in FIG. 4, in which there have been shown axial notches 40 each of which has a radially decreasing height from the root to the free end.

We claim:
1. A flow control valve which can be connected between a source of fluid under pressure and a fluid utilizer, and between said utilizer and an exhaust to adjust the rate of flow of fluid from said source to said utilizer, and from said utilizer to said exhaust, said valve comprising a supply chamber in communication, through a supply duct, with said source, a utilization chamber in communication through a utilization duct with said utilizer, a discharge chamber in communication through a first discharge duct with said exhaust, said chambers being disposed alongside one another in axial alignment and being formed in a valve body; a slide valve movable axially within said chambers and substantially comprising a first and a second cylindrical end section having the same diameter and a central cylindrical section of smaller diameter, said end sections having a blind hole therein, and between each of said end sectins and said central section there being formed a first and a second valve element operable respectively to control the opening of a first port between said supply chamber and said utilization chamber, and a second port between said utilization chamber and said discharge chamber; a spring acting on said first end section of the slide valve and being operable normally to hold said slide valve displaced into its end of stroke position towards the other end of said valve; a control chamber formed in said valve body with a bush having one end thereof to define part of said control chamber into which the end of said second end section of the slide valve projects, said end of said second end section having at least one radial notch therein, said blind hole in said second end section being in communication with said control chamber through said at least one radial notch, said control chamber is in communication with said source of supply through a control duct including a port of predetermined dimensions, said bush being provided with a central passage, said central passage being in communication with said blind hole of said second end section, at least one parallel passge in said bush parallel to said central passage, and an annular groove communicating with said parallel passage and constituting a second discharge duct, said source of supply is exhausted through said second discharge duct having a dischrge opening therein, a valve member in communication with said central passage of said bush, said valve member, when open, permits said central passage to communicate with said at least one parallel passage, said valve member operated by electromagnetic means mounted on said other end of said bush, to vary the size of the opening in said central passage for the purpose of varying the pressure of the fluid in said control chamber in a controlled manner, whereby to control the displacement of said slide valve overcoming the force exerted by said spring.

2. A valve according to claim 1, characterised by the fact that each of the said valve elements includes a conical surface operable to cooperate with the surface of the said first and second port.

3. A valve according to claim 1, characterised by the fact that each said valve element inlcudes a cylindrical surface on which are formed axial notches and which is operable to cooperate with the said first and second port.

4. A valve according to claim 1, characterised by the fact that the said body includes a cavity into which projects the said first end section of the said slide valve, and in which the spring is housed, the said cavity being closed by a plug constituting the abutment for the spring.

* * * * *